United States Patent [19]

Käser

[11] Patent Number: 4,515,599
[45] Date of Patent: May 7, 1985

[54] PROCESS FOR DYEING PAPER

[75] Inventor: Adolf Käser, Bottmingen, Switzerland

[73] Assignee: Ciba Geigy Corporation, Ardsley, N.Y.

[21] Appl. No.: 530,916

[22] Filed: Sep. 9, 1983

Related U.S. Application Data

[63] Continuation of Ser. No. 338,725, Jan. 11, 1982, abandoned, which is a continuation of Ser. No. 182,747, Aug. 29, 1980, abandoned.

[30] Foreign Application Priority Data

Jun. 3, 1980 [CH] Switzerland .................. 4287/80

[51] Int. Cl.$^3$ .................. D06P 1/10; D06P 3/60; D21H 1/46
[52] U.S. Cl. .................. 8/685; 8/686; 8/919; 8/527; 162/162
[58] Field of Search .................. 8/685, 686, 919; 162/162

[56] References Cited

U.S. PATENT DOCUMENTS

| | | | |
|---|---|---|---|
| 2,803,624 | 8/1957 | Byland | 8/685 |
| 2,929,673 | 3/1960 | Schucan | 8/685 |
| 3,211,566 | 10/1965 | Patton | 106/308 |
| 3,537,807 | 11/1970 | Streck | 162/162 |
| 3,894,836 | 7/1975 | Frei | 8/685 |

FOREIGN PATENT DOCUMENTS

| | | |
|---|---|---|
| 592555 | 2/1934 | Fed. Rep. of Germany |
| 636358 | 10/1936 | Fed. Rep. of Germany |
| 639728 | 12/1936 | Fed. Rep. of Germany |
| 2651369 | 2/1977 | Fed. Rep. of Germany |
| 2034344 | 6/1980 | United Kingdom |

Primary Examiner—Maria Parrish Tungol
Attorney, Agent, or Firm—Edward McC. Roberts

[57] ABSTRACT

A process for dyeing paper which comprises the use of dyes of the formula

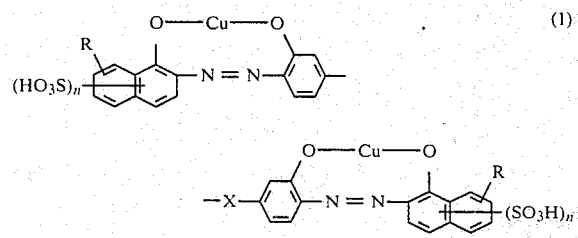

wherein R is hydrogen, hydroxyl or amino, X is the azoxy or azo group, and n is 1 or 2, and the bonds of the complexing oxygen atom in the α-position and of the azo group in the β-position at the naphthalene nuclei are mutually interchangeable. Dyeings of good wetfastness and lightfastness are obtained.

3 Claims, No Drawings

PROCESS FOR DYEING PAPER

This is a continuation of application Ser. No. 338,725 filed on Jan. 11, 1982, which is a continuation of application Ser. No. 182,747, filed on Aug. 29, 1980, now abandoned.

Dyeings obtained on paper with synthetic organic dyes which produce blue shades often have unsatisfactory fastness properties, e.g. wetfastness with water and water/alcohol, as well as lightfastness. It is therefore the object of the present invention to provide dyes which are suitable for dyeing paper in blue shades and which, in addition, do not have the defects referred to. It has been found that the dyes of the formula (1) meet these requirements.

Accordingly, the present invention provides a process for dyeing paper which comprises the use of dyes of the formula

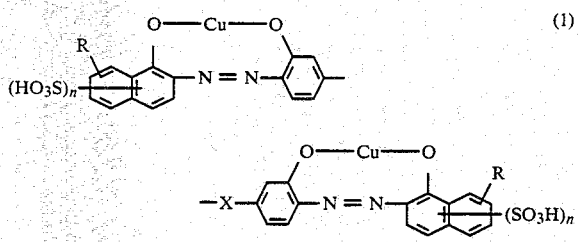

wherein R is hydrogen, hydroxyl or amino, X is the azoxy or azo group, and n is 1 or 2, and the bonds of the complexing oxygen atom in the α-position and of the azo group in the β-position at the naphthalene nuclei are mutually interchangeable.

A preferred embodiment of the invention comprises the use of a dye of the formula

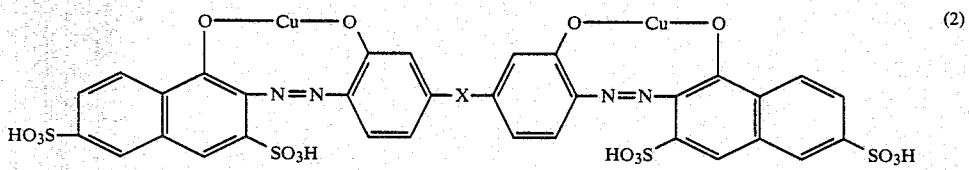

wherein X is as defined for formula (1).

The dyes of the formula (1) can be obtained by reducing a nitromonoazo compound of the formula

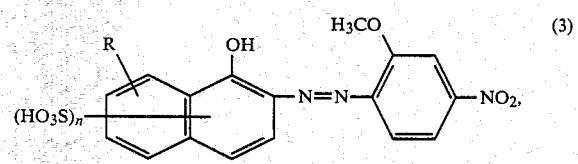

wherein R and n are as defined for formula (1), to the corresponding azoxy or azo compound, and treating this latter with a copper donor under such conditions that the methoxy group in the ortho-position to the azo bridge is cleaved. Instead of coppering in the final step, it is also possible to start from the copper complex of a nitromonoazo compound and to reduce this complex as described above. As reducing agent it is preferred to use a reducing sugar, e.g. D-glucose, in an aqueous alkaline solution. The solution can be made alkaline e.g. with an alkali metal hydroxide, e.g. sodium hydroxide or lithium hydroxide.

The reduction is carried out by adding an aqueous solution of the reducing sugar (preferably from 0.5 to 1.5 moles per mole of nitro compound) to an aqueous solution of the nitromonoazo compound which contains excess alkali metal hydroxide (up to 10 moles per mole of nitro compound), in the temperature range from 50° to 100° C. The rate of reduction can be kept under control by adding the reducing sugar solution at such a rate that the sugar reacts continuously and its concentration in the reaction mixture does not rise. In another method, the sugar solution can be added as quickly as possible, and the reduction with an acid is discontinued when it is found that the reaction is complete.

The reduction of a nitromonoazo compound of the formula (3) to a corresponding azoxy or azo compound can also be carried out with formaldehyde.

The dye solution obtained from the reduction can be used as such. However, it is also possible to isolate the dye by conventional methods and then to dissolve it again in water. To obtain a maximum solubility in water it is preferred to convert the dye at least partially to a lithium or alkanolamine salt, e.g. a diethanolamine or triethanolamine salt. Urea can be added to the dye solutions.

The nitromonoazo compounds of the formula (3) are obtained by diazotising 2-amino-5-nitroanisole and coupling the diazo compound to a naphtholsulfonic acid. Examples of suitable coupling components are:

1-amino-8-hydroxynaphthalene-2,4-disulfonic acid,
1-amino-8-hydroxynaphthalene-4,6-disulfonic acid,
1,8-dihydroxynaphthalene-3,6-disulfonic acid,
1-hydroxynaphthalene-3,6-disulfonic acid,
1-hydroxynaphthalene-3,8-disulfonic acid,
2-hydroxynaphthalene-3,6-disulfonic acid,
2-hydroxynaphthalene-5,7-disulfonic acid,
2-hydroxynaphthalene-6,8-disulfonic acid.

The diazotisation of the diazo components is effected as a rule with nitrous acid in aqueous-mineral acid solution at low temperature, and the coupling to the coupling components is carried out at weakly acid or neutral to weakly alkaline pH values.

Suitable copper donors are salts which contain copper as cation, e.g. copper sulfate, copper chloride or copper acetate. It is often advantageous to use complex copper compounds, e.g. in the form of copper-amine complexes such as copper tetraamine sulfate obtained from copper sulfate and ammonia, pyridine or monoethanolamine, or in the form of compounds which contain copper bound as a complex, e.g. complex compounds of alkali salts of aliphatic aminocarboxylic acids or hydroxycarboxylic acids, e.g. glycocoll, lactic acid and, in particular, tartaric acid, e.g. sodium copper tartrate.

The treatment with the copper donor is carried out in aqueous or organic-aqueous medium, e.g. at room temperature if readily metallisable compounds are used as starting materials, or by heating to a temperature in the range from 50° to 120° C. in a closed vessel under pressure, whilst the pH values are determined by the nature of the chosen method of metallising: for example an acid coppering with copper sulfate, and an alkaline coppering with copper tetraamine sulfate. If desired, it is also possible to add solvents, e.g. alcohol, dimethyl formamide etc., during the metallisation.

The dyes of the formula (1) or (2) can be used in solid or liquid form for dyeing paper. In powder or granular formulations the dyes are used in particular for discontinuous mass dyeing, in which the dye is added batchwise in the pulper, hollander or the mixing chest. It is preferred to use the dyes in the form of preparations which can contain extenders, e.g. urea as solubiliser, dextrin, sodium sulfate, sodium chloride, as well as dispersants, dust removers, and sequestering agents such as tetrasodium pyrophosphate.

Accordingly, the invention also provides solid dyestuff preparations for dyeing paper which contain dyes of the formula (1) or (2).

In recent years the use of concentrated aqueous solutions of dyes has gained importance because of the advantages such solutions have over dyes in powder form. The use of solutions avoids the difficulties attendant on dust formation and the users are spared the time-consuming and often difficult procedure of dissolving the dye powder in water. Moreover, the use of concentrated solutions was prompted by the development of continuous methods of dyeing paper, as in these methods it is advantageous to meter the solution direct into the hollander or at any other suitable point in the system of paper manufacturing. It is therefore a further object of the invention to provide concentrated aqueous solutions of dyes of the formulae (1) or (2), said solutions containing at least 10 parts by weight of dye in 90 parts by weight of water. Preferably the solutions are even more concentrated and contain about 20 parts by weight of dye in 80 parts by weight of water.

Concentrated aqueous solutions of dyes of the formula (1) are prepared by filtering the suspension obtained in the production of the dye and adding the requisite amount of water and, optionally, further additives, or by suspending the isolated dye in hydrochloric acid, filtering once more, and mixing the filter cake with lithium hydroxide and the requisite amount of water. Such a dye solution is suitable for dyeing a paper pulp in the presence of rosin and alum size.

The lithium salts of dyes of the formula (1) can also be obtained direct by carrying out the reduction of the nitromonoazo compounds of the formula (3) with glucose in the presence of lithium hydroxide instead of sodium hydroxide, and salting out the uncoppered intermediate by addition of lithium chloride instead of sodium chloride.

The dyes of the formula (1) are distinguished by blue shades, high substantivity, good lightfastness and fastness to wastewater.

The aqueous concentrates of the invention, which are stable at storage temperatures of up to −5° C., are suitable for dyeing paper, on which they produce attractive blue shades, with or without the use of a size.

Dyes of the formula (1) are known from German patent specification Nos. 592 555, 636 358 and 639 728, but their use for dyeing paper has not been disclosed. Compared with the paper dyes described in German Offenlegungsschrift No. 2 651 369, the dyes of the formula (1) used in the practice of this invention produce on paper dyeings having substantially better lightfastness properties.

In the description and claims of this specification the dyes of the formulae (1) and (2) are represented as being in the form of the free acids, but preferably they are in the form of salts, especially alkali salts, or they are separated in the form of salts during their production. As is customary in dyestuff literature, the formula representing the free acid is to be regarded as equivalent to that representing the salt.

The invention is illustrated by the following Examples, in which parts are by weight.

EXAMPLE 1

16.9 parts of 2-amino-5-nitroanisole are diazotised and the diazo compound thereby obtained is coupled to 30.4 parts of 1-naphthol-3,6-disulfonic acid at a pH value of 8 to 9. To the suspension of the resultant monoazo dye are added 132 parts of 30% sodium hydroxide solution and the mixture is heated to 60° C. to form a solution. With stirring, a solution of 14.9 parts of glucose in 75 parts of water is added dropwise at 60° C. in the course of 1 hour. As soon as no more starting material can be detected by chromatography, the dye is precipitated from the hot solution with 125 parts of sodium chloride. The moist paste of the isolated blue dye is suspended in 400 parts of water and to the suspension are added 68 parts of 24% ammonia and a small amount of emulsifier. A solution of 24.9 parts of copper sulfate in 150 parts of water is added dropwise at 60° C. in the course of 30 minutes, and finally the reaction solution is stirred for 3 hours under strong reflux. The copper complex dye is salted out hot with 160 parts of sodium chloride, filtered, washed with 20% sodium chloride solution, and subsequently dried. The dye colours paper in a light reddish blue shade of good fastness properties, especially good lightfastness.

The filter cake isolated as described above can be worked up in the following manner:

The dye is suspended in hydrochloric acid and the suspension is filtered. A concentrated aqueous solution of the dye is obtained by mixing the filter cake with up to 5 parts of lithium hydroxide monohydrate and the requisite amount of water to give 500 parts of a solution which, after filtration to remove traces of impurities, can be stored for at least several months. The dye solution is suitable for dyeing paper pulp in the presence of rosin and alum size to produce an attractive blue shade.

Further dyes of the formula (1) can be obtained in the above described manner by using the coupling components listed in the first column of the following table. The second column indicates the shades obtained on paper.

| 2 | 1-amino-8-hydroxynaphthalene-2,4-disulfonic acid | greenish blue |
|---|---|---|
| 3 | 1-amino-8-hydroxynaphthalene-4,6-disulfonic acid | " |
| 4 | 1,8-dihydroxynaphthalene-3,6-disulfonic acid | " |
| 5 | 1-hydroxynaphthalene-3,6-disulfonic acid | blue |
| 6 | 1-hydroxynaphthalene-3,8-disulfonic acid | " |
| 7 | 2-hydroxynaphthalene-3,6-disulfonic acid | reddish blue |
| 8 | 2-hydroxynaphthalene-5,7-disulfonic acid | " |
| 9 | 2-hydroxynaphthalene-6,8-disulfonic acid | " |

DYEING EXAMPLES

Example 1

Printing paper 800 kg of bleached sulfate cellulose and 200 kg of bleached sulfite cellulose are charged, as supplied, into a pulper which contains 14 m³ of production water and impacted until the pulp is free from specks. The impacting procedure takes 30 minutes. The impacted pulp is thereafter discharged into a dump chest. From the dump chest the pulp suspension is beaten to a fineness of 25° SR and subsequently conveyed to a mixing chest. To the mixing chest are further added 250 kg of kaolin Ia (as filler) and 1% of dye, based on the weight of absolutely dry fibres, in the form of an aqueous solution of 20 g/l. After an exhaustion time of 15 minutes. 2% of resin size (absolutely dry) and after 10 minutes 4% of alum (both based on the weight of absolutely dry cellulose), are added. The pulp suspension has a pH of 5.3 and is conveyed to the paper machine by means of the procedure commonly employed in the paper industry.

EXAMPLE 2

Tissue paper 1000 kg of bleached sulfate cellulose are charged, as supplied, into a pulper which contains 14 m³ of production water and impacted until the pulp is free from specks. The impacting procedure takes 30 minutes and thereafter the pulp is emptied into a dump chest. From the dump chest the pulp is beaten to a fineness of 25° C. SR and subsequently conveyed to a mixing chest, to which 1% of dye, based on the weight of absolutely dry fibres, is added in the form of an aqueous solution of 20 g/l. The pulp suspension has a pH of 7. After an exhaustion time of 15 minutes, this pulp is conveyed to the paper machine by means of the procedure commonly employed in the paper industry.

EXAMPLE 3

Size press application 5 kg of dye are dissolved in 1000 liters of a 10% anionic starch solution and applied by means of a size press. The application of the above solution is 1.5 g/m², absolutely dry, per page.

What is claimed is:

1. A process for dyeing paper which comprises applying to the paper a dye of the formula

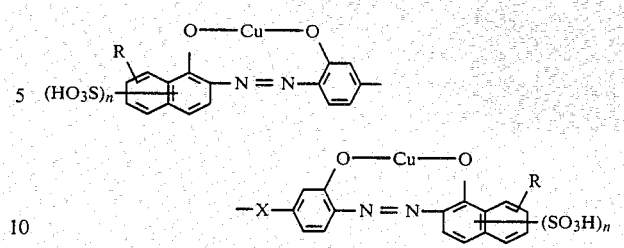

wherein R is hydrogen, hydroxyl or amino, X is azoxy or azo, and n is 1 or 2, and the bond of the complexing oxygen atom in the α-position and the bond of the azo group in the β-position at each of the naphthalene nuclei are interchangeable.

2. The process of claim 1 wherein the dye is of the formula

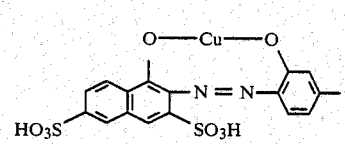

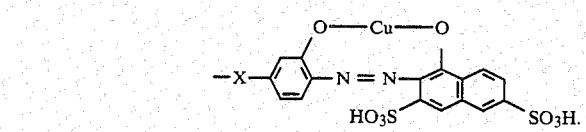

3. Paper dyed by the process which comprises applying to the paper a dye of the formula

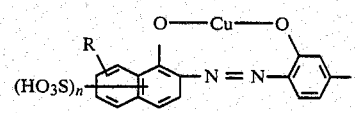

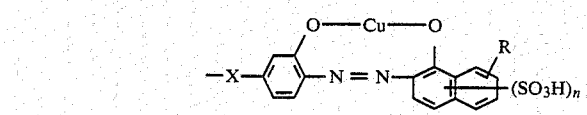

wherein R is hydrogen, hydroxyl or amino, X is azoxy or azo, and n is 1 or 2, and the bond of the complexing oxygen atom in the α-position and the bond of the azo group in the β-position at each of the naphthalene nuclei are interchangeable.

* * * * *